United States Patent [19]

Arndt et al.

[11] Patent Number: 5,060,761
[45] Date of Patent: Oct. 29, 1991

[54] AUTOMATIC LUBRICATING DEVICE FOR THE CHISEL OF A HYDRAULIC STRIKING MECHANISM

[75] Inventors: Friedrich K. Arndt; Robert-Jan Bartels; Heribert Vielhaber, all of Essen, Fed. Rep. of Germany

[73] Assignee: Krupp Maschinentechnik Gesellschaft mit beschränkter Haftung, Essen, Fed. Rep. of Germany

[21] Appl. No.: 620,704

[22] Filed: Dec. 3, 1990

[30] Foreign Application Priority Data

Dec. 1, 1989 [DE] Fed. Rep. of Germany ....... 3939785

[51] Int. Cl.$^5$ ............................................. F01M 9/02
[52] U.S. Cl. .................................. 184/6.14; 184/6.4; 184/7.4; 184/29; 184/39.1; 60/456
[58] Field of Search .................. 184/6.14, 7.4, 6.4, 184/39, 39.1, 41, 54, 29; 60/456; 30/123.3; 173/65, 77

[56] References Cited

U.S. PATENT DOCUMENTS

| | | | |
|---|---|---|---|
| 1,992,052 | 2/1935 | Bizzarri | 184/39 |
| 2,351,620 | 6/1944 | Kocher | 184/6.14 |
| 2,459,937 | 1/1949 | Hassman et al. | 184/6.14 |
| 3,608,672 | 9/1971 | Dandridge | 184/7.4 |
| 3,693,757 | 9/1972 | Callahan et al. | 184/7.4 |
| 4,047,595 | 9/1977 | Baker, Jr. | 184/6.14 |
| 4,219,963 | 9/1980 | Mallett | 30/123.3 |
| 4,646,854 | 3/1987 | Arndt et al. | 173/134 |

FOREIGN PATENT DOCUMENTS

| | | |
|---|---|---|
| 120522 | 10/1984 | European Pat. Off. |
| 2138544 | 2/1972 | Fed. Rep. of Germany |
| 3317829 | 11/1983 | Fed. Rep. of Germany |
| 3443542 | 6/1986 | Fed. Rep. of Germany |
| 8500784 | 10/1986 | Netherlands |
| 2157219 | 10/1985 | United Kingdom |

*Primary Examiner*—Ira S. Lazarus
*Assistant Examiner*—Alan B. Cariaso
*Attorney, Agent, or Firm*—Spencer & Frank

[57] ABSTRACT

An automatic lubricating arrangement for a chisel of a hydraulic striking mechanism. A conveying unit is adapted for connection to the chisel guide supporting the chisel of the striking mechanism for charging the chisel guide with lubricating grease and is further connected to the source of operating pressure for the striking mechanism. The conveying unit includes a conveying chamber for receiving lubricating grease and a mechanism for performing a predetermined conveying stroke of adjustable magnitude each time the striking mechanism is charged with operating pressure for forcing lubricating grease out of the chamber and into the chisel guide under pressure derived from the source of operating pressure. A lubricant reservoir for storing lubricating grease is connected to the conveying unit and has a movable separating element and compression spring biasing the separating element against the lubricating grease for supplying lubricating grease to the conveying chamber of the conveying unit.

14 Claims, 3 Drawing Sheets

AUTOMATIC LUBRICATING DEVICE FOR THE CHISEL OF A HYDRAULIC STRIKING MECHANISM

CROSS REFERENCE TO RELATED APPLICATIONS

The present application claims the rights of priority with respect to application Ser. No. P 39 39 785.8 filed Dec. 1st, 1989 in the Federal Republic of Germany, the subject matter of which is incorporated herein by reference.

BACKGROUND OF THE INVENTION

The present invention relates to an automatic lubricating arrangement for the chisel of a hydraulic striking mechanism, the lubricating arrangement including a lubricant conveying unit connected to a lubricant reservoir for charging the chisel guide supporting the chisel with lubricant.

Hydraulic striking mechanisms (also called hydraulic hammers, or rock chisels, hydraulic chisels or rock breakers), are disclosed, for example, in German Offenlegungsschrift DE-OS 3,443,542 [corresponding to U.S. Pat. No. No. 4,646,854] and in many cases are fastened to a carrier unit having an associated energy supply, for example to the boom of a hydraulic excavator. When the striking mechanism is in use, its chisel, which is driven by means of a striking piston and performs a considerable number of longitudinal movements per second, is unavoidably stressed in the manner of a crowbar with the consequence that the chisel guides and the associated chisel section are subjected to great stress. In order to counteract excess wear and/or the possibility of friction welds in the region of the chisel guide, the latter must be lubricated sufficiently, if possible continuously or at regular time intervals which are adapted to the working conditions.

In the past, automatic lubricating devices of the above-mentioned type have supplied the chisel guide with liquid lubricants (that is oils or the like) and have been a part of a central supply unit equipped with relatively long lubricant conduits.

If the striking mechanism is subjected to high and possibly maximum stresses, the use of lubricants having a high solid lubricant content (for example chisel pastes) has been found to be particularly advantageous. Due to their viscosity and their content of solid lubricants, however, these substances are difficult to convey even at normal ambient temperatures, and thus under certain circumstances jeopardize the supply of lubricant into a region to be lubricated. For this reason, chisel guides have in the past been supplied with grease of the above-mentioned type by means of a grease filled, manually operated lever press. Since such a press is actuated manually, the lubricant supply depends solely on the expertise and/or attention of the respective operator.

SUMMARY OF THE INVENTION

It is an object of the invention to provide an automatic lubricating arrangement for the chisel of a hydraulic striking mechanism by means of which grease having a very high content of solid lubricants can be reliably transported into the region of the chisel guide even at lower temperatures.

It is another object of the invention to provide a lubricating arrangement of the above type such that the lubricating process can be monitored.

It is a further object of the invention to provide a lubricating arrangement of the above type wherein it is possible to change the quantity of lubricant to be supplied and/or the lubrication intervals in accordance with respectively existing working conditions or those to be expected.

The above and other objects are accomplished according to the invention by the provision of an automatic lubricating arrangement for a chisel of a hydraulic striking mechanism which is charged from a source of operating pressure, the chisel being movable within a chisel guide, the arrangement including: conveying means adapted for connection to the chisel guide for charging the chisel guide with lubricating grease and for connection to the source of operating pressure for the striking mechanism, the conveying means including a conveying chamber for receiving lubricating grease and means for performing a predetermined conveying stroke of adjustable magnitude each time the striking mechanism is charged with operating pressure for forcing lubricating grease out of the conveying chamber and into the chisel guide under pressure derived from the source of operating pressure; and means defining a lubricant reservoir for storing lubricating grease, the lubricant reservoir being connected to the conveying means and having a movable separating element and compression spring means biasing the separating element against the lubricating grease for supplying lubricating grease to the conveying chamber of the conveying means.

The principle on which the present invention is based thus resides in supplying the lubricating grease to the lubricant conveying unit by way of a pressure charged lubricant reservoir and to configure the conveying unit so that its conveying pressure is generated by the operating pressure driving the striking mechanism. In this way, the conveying unit is made to perform a conveying stroke of adjustable magnitude whenever the striking mechanism is charged with the operating pressure. Additionally, giving consideration of the high viscosity of the lubricating grease, the conveying unit is arranged with respect to the striking mechanism so that the path to be traversed by the lubricating grease from the conveying chamber in the conveying unit to the chisel guide is relatively short. Accordingly, the lubricating arrangement, composed essentially of the lubricant reservoir and the conveying unit, is preferably integrated in the striking mechanism, fastened to the striking mechanism or at least disposed in the vicinity of the location to be lubricated, i.e. in the vicinity of the chisel guide.

The lubricating arrangement operates independently in that the conveying unit, which is connected to the supply of operating pressure for the striking mechanism, performs a conveying stroke whenever the striking mechanism is charged with operating pressure. The conveying stroke, the magnitude of which can be varied to adapt the volume of lubricating grease conveyed to different operating conditions, transports the lubricating grease pressed into the conveying chamber by way of the lubricant reservoir in the direction toward the chisel guide.

In its simplest embodiment, the lubricating arrangement according to the invention is configured so that the conveying unit, which is continuously charged with lubricating grease from the lubricant reservoir, performs a single conveying stroke only if the striking mechanism is put into operation by the application of the operating pressure. The amount of lubricant supplied in that way is sufficient in almost all cases since the striking mechanism is usually removed from the material to be worked after a short period of operation and/or is stopped. A renewed activation of the striking mechanism then results in the performance of a further lubrication process.

Independently of the operating conditions, the operator is able to influence the lubricant supply in that the striking mechanism can be intentionally stopped from time to time and started again.

According to another aspect of the invention, the conveying unit is connected to the operating pressure conduit of the striking mechanism through the intermediary of an interrupter, that is a device for blocking operating pressure to the conveying unit. Beginning with each activation of the striking mechanism, the interrupter releases the connection to the pressure conduit at successive, preselectable intervals. The advantage realized thereby is that the conveying unit automatically performs further, additional conveying strokes at given, adjustable intervals after the striking mechanism has been switched on. Accordingly, if the striking mechanism is in operation for longer periods of time, the chisel guide is lubricated several times at given intervals. Due to a repetition of lubricating processes which is independent of the operator, there will be no lack of lubricant even after longer, uninterrupted periods of work performed by the striking mechanism.

The interrupter, or blocking device, may, in particular, be a time controlled blocking valve. The time control may be composed, in particular, of a control including a time relay which is activated by the activation of the striking mechanism and, by way of time-successive pulses, briefly moves the blocking valve into the open position in which the conveying unit performs a conveying stroke under the influence of the operating pressure.

In deviation from the just described embodiment, the invention may also be implemented in that the lubricating device includes only a manually operated interrupter. The latter would enable the operator to initiate, as desired, a further lubricating process or several further lubricating processes in succession following the automatically performed lubricating process without having to stop the striking mechanism.

The movable separating element, for example a piston or a membrane, in the lubricant reservoir, by way of which the lubricant can be charged with a preliminary driving force, may be supported by a mechanically or hydraulically acting compression spring. Preferably, the spring is a cushion of gas which is shielded from the lubricating grease by the separating element.

Preferably, the conveying unit includes a conveying piston and a reset element, for example compression spring, which counteracts the linear conveying movement of the conveying piston. A conveying channel opens into the conveying chamber and is equipped with a check valve. An adjustment stop is provided at one end of the conveying chamber to delimit the conveying stroke of the conveying piston. The conveying unit is further configured so that the connecting channel between the lubricant reservoir and the conveying unit, when seen in the direction of flow of the lubricating grease, opens into the conveying chamber upstream of the conveying channel and can be closed by means of the conveying piston.

As long as the conveying piston is not charged with the operating pressure of the striking mechanism, it remains in its starting position under the influence of the reset element in which lubricant can be pressed into the conveying chamber through the connecting channel with the lubricant reservoir. As soon as the operating pressure becomes effective, the conveying piston, during its conveying stroke, interrupts the connection between the connecting channel and the conveying chamber and pushes the lubricating grease, with the check valve open, into the conveying channel until the adjustment stop, in the simplest case an adjustment pin or an adjustment screw, interrupts the conveying movement of the conveying piston. The magnitude of the conveying stroke (and thus the associated volume of lubricating grease conveyed) can be adjusted in a simple manner, for example, in that the adjustment stop can be displaced in the direction toward or away from the conveying piston and secured at the desired position.

The reliability of operation of the lubricating arrangement according to the invention can be further improved by equipping the lubricant reservoir with a fill level sensor which initiates a fill level signal when the level of lubricating grease approaches a minimum limit. This signal calls the operator's attention to the fact that the lubricant supply must be replenished. The fill level sensor may be equipped so that the fill level signal is initiated when the separating element approaches a limit position. A particularly simple embodiment includes a fill level sensor in the form of a proximity or limit switch which is actuated by the separating element itself or by components that move with it.

Advantageously, the fill level signal can be made optically and/or acoustically discernible by means of an appropriate indicator connected with the output of the fill level sensor. A warning lamp and/or a horn, respectively, are suitable as indicators.

According to a further advantageous feature of the invention, the fill level sensor is followed by a spring charged turn-off valve which, if a fill level signal is present, takes on the closed position to interrupt the operating pressure to the striking mechanism. The turn-off valve not only causes the striking mechanism to be stopped once the fill level in the lubricant reservoir approaches a limit value, it also prevents the operator from switching the striking mechanism on again (that is, unless the lubricant supply is first replenished).

To provide for monitoring of the operation of the conveying unit and the performance of the lubricating processes, the conveying channel emanating from the conveying chamber is preferably equipped with a lubrication control sensor including a control indicator connected to its output to make visible each conveying stroke in the form of a conveying signal; preferably, the control indicator provides an optical indication. In particular, the lubrication control sensor may be a pressure sensor which is installed in the conveying channel. This sensor determines the increase in pressure in the conveying channel caused by a conveying stroke of the conveying unit and converts it into a pulse for actuating the control indicator.

Desirably, the lubricant reservoir is composed of a commercially available lubricant cartridge which can be exchangeably placed into a receptacle in the conveying unit, thus simplifying and minimizing physical manipulation required for replenishing the reservoir. In such an embodiment, the lubricant supply can be replenished easily and without much loss of time in that the previously employed lubricant reservoir is separated from the conveying unit and replaced by a full lubricant cartridge.

The invention will now be described in greater detail with reference to embodiments thereof that are illustrated in the drawing figures.

DETAILED DESCRIPTION OF PREFERRED EMBODIMENTS

Figure 1A:
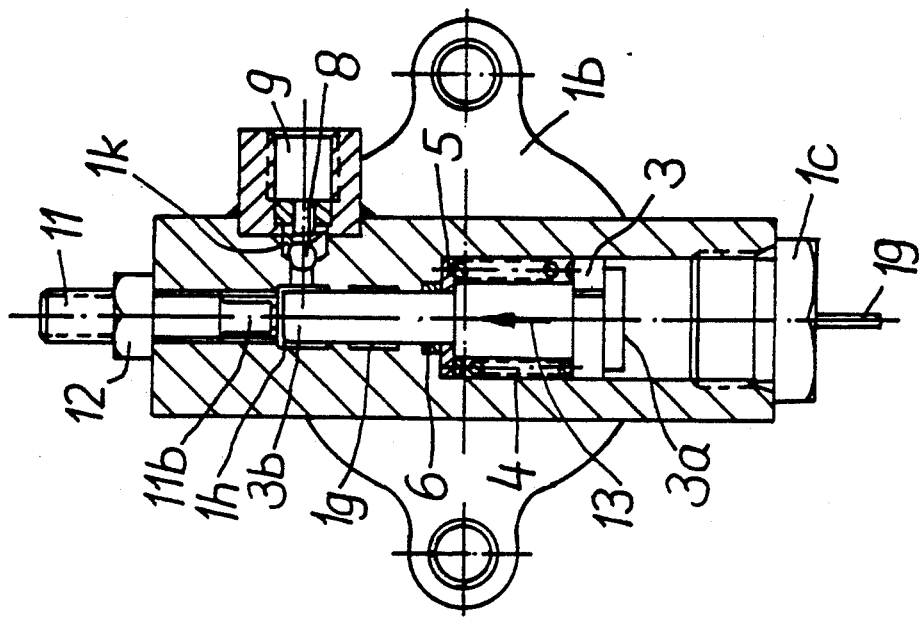
FIG. 1a is a vertical sectional view of a conveying unit according to the invention in the form of a pump for the lubricating grease equipped with an associated lubricant reservoir, with the conveying piston of the conveying unit being in the pressure-free starting position.

FIG. 1a shows the major components of a conveying arrangement according to the invention including a conveying unit 1, which in essence is a pump, and a lubricant reservoir 2 releasably fastened to conveying unit 1.

Conveying unit 1 is composed of a cylinder housing 1a and a fastening flange 1b (shown in FIG. 1b) fastened thereto as well as a terminating plate 1c provided with a bore 1d through which a conveying piston 3 which is linearly displaceable within cylinder housing 1a can be charged with pressure.

FIG. 1a shows conveying unit 1 in its pressure-free starting position, with the bottom face 3a of conveying piston 3 being supported on terminating plate 1c under the influence of a pre-tensioned reset spring 4. Reset spring 4 is held within in a bore 1e within cylinder housing 1a by way of a plate 5. Bore 1e is sealed against the environment above plate 5 by means of a seal 6.

Figure 1B:
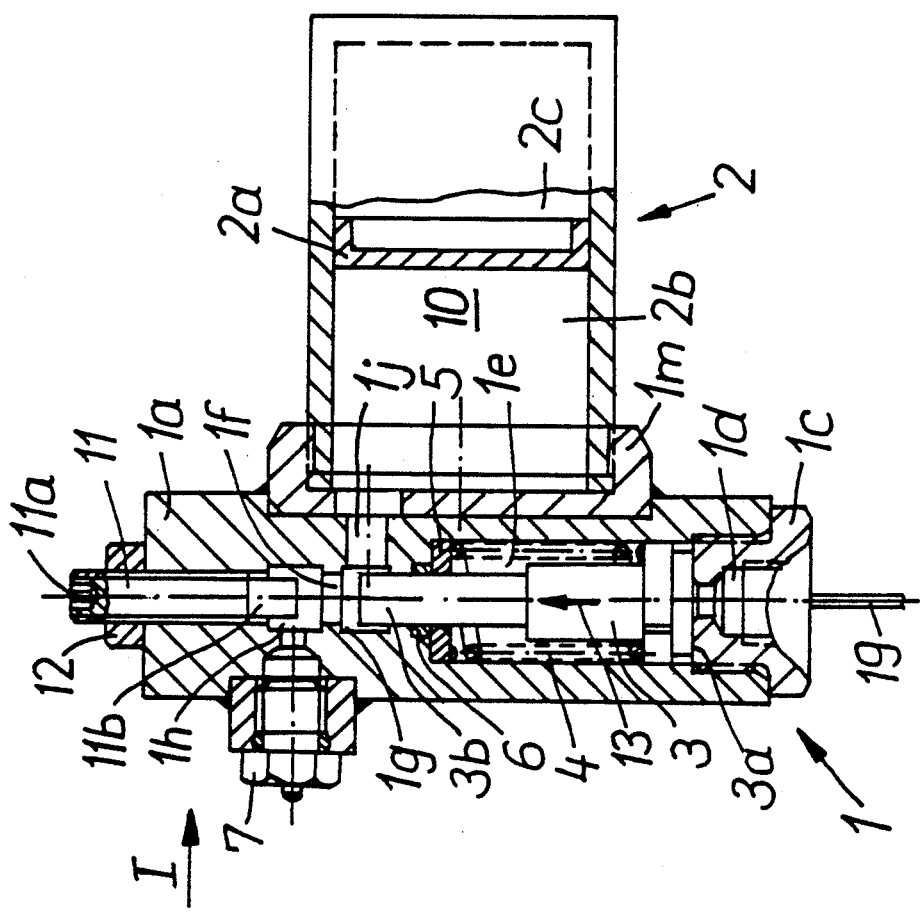
FIG. 1b is a sectional view through the axis of the conveying unit shown in FIG. 1 during the conveying stroke, seen in the direction of arrow I.

Above seal 6, there is a conveying chamber 1f including a lower widened portion 1g and a widened portion 1h spaced at a distance above it. Widened portion 1h is in communication with a ventilation valve 7 (FIG. 1a), and by way of a conveying channel 1k equipped with a check valve 8, with a connecting socket 9 (FIG. 1b). A connecting channel 1j opening into the lower widened portion 1g permits the connection of the interior 2b of lubricant reservoir 2 filled with a lubricating grease 10 (see in this connection FIG. 2) with conveying chamber 1f.

In the starting position, the upper end section 3b of conveying piston 3 projects only partially into widened portion 1g so that the connection between channels 1f and 1j is not interrupted.

Upper end section 3b is faced by an adjustment stop 11 in the form of a threaded bolt having a hexagon socket head 11a whose position relative to cylinder housing 1a is fixed by a locknut 12. The internal end section 11b of adjustment stop 11 projects partially into the upper widened section 1h and delimits the upward conveying stroke which conveying piston 3 is able to perform when charged with pressure. The conveying movement of piston 3 is indicated by an arrow 13.

FIG. 1b shows that, during its conveying stroke in the direction of arrow 13, conveying piston 3 closes the lower widened portion 1g with the result that the lubricating grease 10 disposed in conveying chamber 1f (see FIG. 1b), when check valve 8 is open, is able to escape only through conveying channel 1k. The conveying movement of conveying piston 3 is thus stopped as soon as the latter is supported, by way of its end section 3b on the end section 11b of adjustment stop 11.

By release of locknut 12, adjustment stop 11 can be moved so that its end section 11b approaches to a greater or lesser degree the conveying piston 3 which in FIG. 1a, for example, is in its starting position. A displacement of end section 11b, for example, in the direction toward conveying piston 3 results in a reduction of the conveying stroke in the direction of arrow 13 and thus in a reduction of the volume of lubricating grease conveyed by conveying unit 1. It is understood of course that by charging conveying piston 3 with the operating pressure of the striking mechanism, the conveying unit performs only one conveying stroke each time. Once the conveying stroke has been performed, the conveying piston remains in its end position defined by adjustment stop 11 as long as the operating pressure is present.

The interior of lubricant reservoir 2 is divided into two chambers by a displaceably held piston-like separating element 2a. Chamber 2b facing conveying unit 1 contains the already mentioned lubricating grease 10, while chamber 2c is a gas cushion serving as a pre-tensioned compression spring. Under the influence of the gas cushion, separating element 2a exerts an advancing force on lubricating grease 10 disposed in chamber 2b (see FIG. 2) with the result that the lubricating grease is pressed through connecting channel 1j and widened portion 1g into conveying chamber 1f as long as conveying piston 3 is in a position in the region of its starting position (FIG. 1a), that is, the connection between widened portions 1g and 1h has not yet been interrupted.

Figure 2:
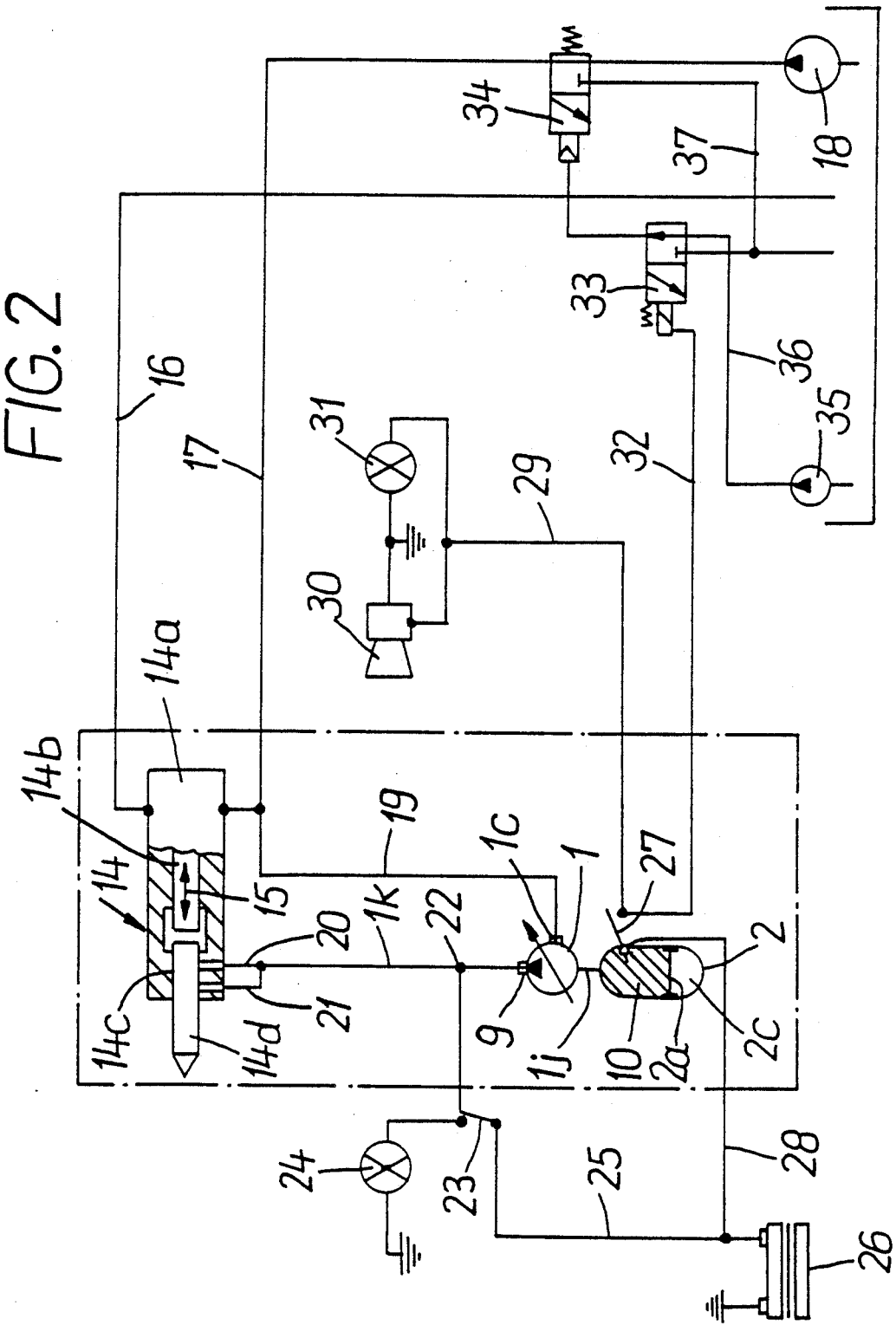
FIG. 2 is a circuit schematic showing the interaction of the conveying unit and its lubricant reservoir with a striking mechanism in the form of a hydraulic hammer and additional control devices.

Referring to FIG. 2, the hydraulic striking mechanism 14 to be supplied with lubricating grease and configured as a hydraulic hammer is composed of a cylinder housing 14a including a striking piston 14b which is moved back and forth therein in the direction of the double arrow 15. The striking piston in turn drives a chisel 14d supported in a chisel guide 14c. Striking mechanism 14 is connected to a pressure-free return line 16 and can be put into operation in that its pressure conduit 17 is connected to an energy pressure source 18 which furnishes the operating pressure.

Connecting bore 1d of conveying unit 1 is connected by way of terminating plate 1c with a conduit 19 which in turn is connected with pressure conduit 17 (see FIGS. 1a and 2).

In the region of chisel 14d, conveying channel 1k which extends behind connecting socket 9 (see FIG. 1b) is divided into two channels 20 and 21 through which chisel guide 14c is lubricated.

If, as shown in FIG. 2, striking mechanism 14 is put into operation by charging pressure conduit 17 with pressure, conveying unit 1, which is charged with pressure at the same time, performs a conveying stroke with the result that chisel guide 14c receives lubricating grease through conveying channel 1k and through channels 20, 21. Corresponding to the structure and operation of conveying unit 1 as described, the lubricating process initiated by a conveying stroke can be repeated as often as desired by interrupting the connection formed by conduits 19, 17 with pressure energy source 18 and then re-establishing it again.

In order to monitor the lubricating processes, conveying channel 1k is equipped with a lubrication control sensor 22 in the form of a pressure sensor. Advantageously, sensor 22 is connected for actuating a switch 23 so that a control lamp 24, which is connected by way of a wire 25 with an energy source in the form of a battery 26, generates an optical conveying signal. This occurs only if the pressure in conveying channel 1k as determined by means of lubrication control sensor 22 goes above a predetermined pressure limit value. The monitoring circuit composed of components 22 to 26 thus takes advantage of the fact that each conveying stroke of conveying unit 1 with which lubricating grease is also moved, temporarily leads to an increase in pressure in conveying channel 1k.

The fill level in lubricant reservoir 2 can be monitored by means of a fill level sensor in the form of a limit switch 27 which is actuated when separating element 2a approaches a predetermined limit position. This switch closes a circuit including battery 26 and wires 28 and 29 and two indicator units in the form of a horn 30 and a warning lamp 31. As soon as the fill level of lubricant reservoir 2 approaches a preset minimum limit value, an optical and acoustical fill level signal are initiated simultaneously in the present case. These signals indicate to the operator that the supply of lubricating grease must be replenished, possibly by an exchange of lubricant reservoirs 2.

With the use of a fill level sensor in the form of limit switch 27, a further monitoring circuit is advantageously provided with which striking mechanism 14 can be stopped automatically when the fill level reaches the limit value as shown in FIG. 2. This monitoring circuit is composed of a control line 32 and a control valve 33 by means of which the position of a spring biased turn-off valve 34 can be influenced. The latter interrupts, in its closed position (not shown), the connection between pressure energy source 18 and conduits 17 and 19 which are in communication with striking mechanism 14 and conveying unit 1, respectively.

Control valve 33 (in deviation from the purely schematic illustration of FIG. 2) is connected so that it charges turn-off valve 34 with control pressure by way of an energy source 35 and a control conduit 36 only if limit switch 27 is closed and thus connects pressure energy source 18 directly with a pressure-free return conduit 37, thereby stopping hydraulic striking mechanism 14 and conveying unit 1.

As long as no fill level signal is present so that limit switch 27 is thus open, control valve 33 takes on a second position (not shown) in which the connection between control conduit 36 and turn-off valve 34 is interrupted and the latter takes on the illustrated open position. The monitoring circuit including components 27 and 32 to 37 not only ensures that hydraulic striking mechanism 14 is stopped if a fill level signal is present, it also prevents the operator from starting up the striking mechanism again without taking special measures.

The dot-dash lines around the region in FIG. 2 are to indicate that the associated components form a unit.

In particular, conveying unit 1 should be arranged with respect to striking mechanism 14 so that the path traversed by the lubricant between conveying chamber 1f (see FIG. 1a) and chisel guide 14c (FIG. 2) is short.

Figure 3:
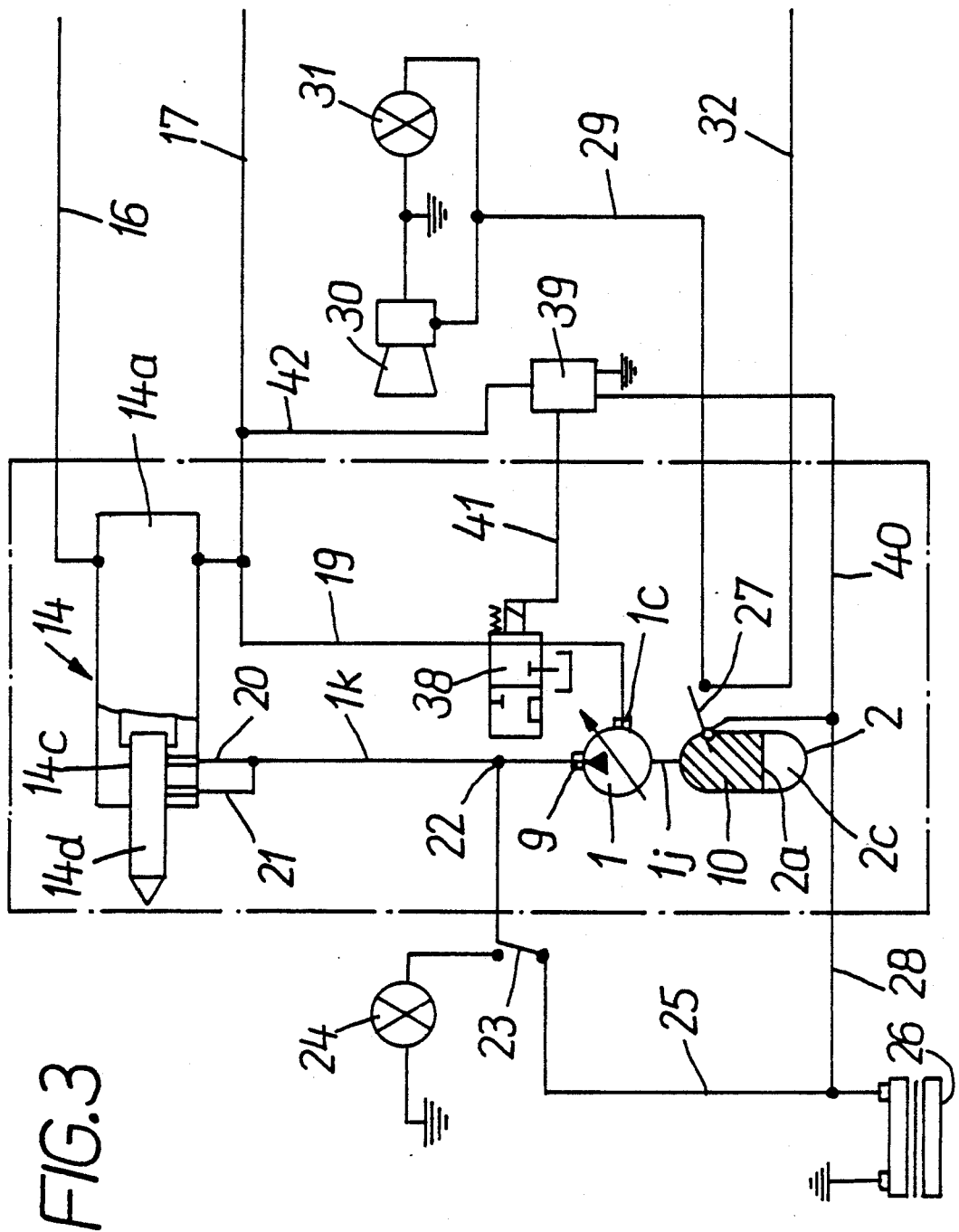
FIG. 3 is a circuit schematic modified compared to that of FIG. 2 and including a conveying unit whose mode of operation is additionally influenced by a control device.

In the embodiment according to FIG. 3, conveying unit 1 is connected to pressure conduit 17 of striking mechanism 14 through the intermediary of a time controlled blocking valve 38 installed in conduit 19. Blocking valve 38 is actuated by a control device 39 which is equipped with a time relay. This actuation occurs by way of an input line 40 in communication with battery 26 and an output line 41 associated with blocking valve 38.

Additionally, control device 39 is connected with pressure conduit 17 by way of a second input line 42 with the result that blocking valve 38, beginning in each case with the actuation of striking mechanism 14, releases the connection between conveying unit 1 and pressure conduit 17 at successive points in time occurring at preselectable intervals. Thus, in the normal case, blocking valve 38 takes up the blocking position (not shown) in which conveying piston 3 of conveying unit 1 (see FIG. 1a) is not charged with pressure and is in its starting position.

As soon as pressure line 17 is connected with the pressure energy source 18 which is at the operating pressure (see FIG. 2) in order to actuate striking mechanism 14, the time relay of control device 39 is actuated by way of the second input line 42. By way of output line 41, this time relay automatically pushes blocking valve 38 into the illustrated open position, thus charging the conveying piston 3 of conveying unit 1 with pressure and initiating the above-described conveying stroke and the resulting lubrication process. Under the influence of control device 39, blocking valve 38 is actuated in the same manner as a timed blocking valve. The advantage realized thereby is that, after the first lubricating process, without it being necessary to stop the operation of striking mechanism 14, conveying unit 1 automatically performs additional lubricating processes at settable time intervals. In this way it is ensured that chisel guide 14c is lubricated sufficiently even during long periods of continuous operation of the striking mechanism.

Preferably, conveying unit 1 is equipped with a receptacle 1m (see FIG. 1a) which makes it possible to attach and exchange without special measures commercially available lubricant cartridges.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An automatic lubricating arrangement for a chisel of a hydraulic striking mechanism which is charged from a source of operating pressure, the chisel being movable within a chisel guide, comprising:
    conveying means adapted for connection to the chisel guide for charging the chisel guide with lubricating grease and for connection to the source of operating pressure for the striking mechanism, said conveying means including a conveying chamber for receiving lubricating grease and means for performing a predetermined conveying stroke of adjustable magnitude each time the striking mechanism is charged with operating pressure for forcing lubricating grease out of said conveying chamber and into the chisel guide under pressure derived from the source of operating pressure; and means defining a lubricant reservoir for storing lubricating grease, said lubricant reservoir being connected to said conveying means and having a movable separating element and compression spring means biasing said separating element against the lubricating grease for supplying lubricating grease to the conveying chamber of said conveying means.

2. An arrangement as defined in claim 1, wherein said conveying means is arranged in the vicinity of the striking mechanism so that the path to be traversed by the lubricating grease between said conveying chamber and the chisel guide channel is short.

3. An arrangement as defined in claim 1, wherein a pressure conduit connects the striking mechanism with the source of operating pressure and said arrangement further comprises a first conduit for connecting said conveying means to the pressure conduit and blocking means disposed in said first conduit for normally blocking operating pressure relative to said conveying means and connecting the operating pressure to said conveying means at successive points in time at preselected intervals, beginning each time upon activation of the striking mechanism, for initiating said conveying stroke for supplying lubricating grease to the chisel guide channel.

4. An arrangement as defined in claim 3, wherein said blocking means includes a time controlled blocking valve.

5. An arrangement as defined in claim 1, wherein said compression spring means comprises a gas cushion.

6. An arrangement as defined in claim 1, wherein said conveying means comprises a conveying channel opening at one end into said conveying chamber and adapted at another end for communicating with the chisel guide channel, a connecting channel connecting said conveying chamber with said lubricant reservoir, a conveying piston disposed for linear movement in said conveying chamber for performing a conveying stroke for conveying lubricating grease into said conveying channel, reset means operatively associated with said conveying piston for counteracting the linear movement of said conveying piston and an adjustment stop disposed for limiting the conveying stroke of said conveying piston, wherein said connecting channel opens into said conveying chamber upstream of said conveying channel, when seen in the direction of flow of lubricating grease, and is closable by means of said conveying piston.

7. An arrangement as defined in claim 6, and further comprising lubrication control sensor means disposed in said conveying channel for sensing a conveying stroke and producing a conveying signal representing the conveying stroke; and indicator means connected to said lubrication control sensor means for providing an indication of the conveying stroke.

8. An arrangement as defined in claim 7, wherein said lubrication control sensor means comprises a pressure sensor for sensing pressure of lubricating grease in the conveying channel.

9. An arrangement as defined in claim 1, wherein said lubricant reservoir includes fill level sensor means for initiating a fill level signal when lubricating grease in said lubricant reservoir approaches a minimum fill level limit.

10. An arrangement as defined in claim 9, wherein said fill level sensor means produces the fill level signal when said separating element approaches a limit position.

11. An arrangement as defined in claim 9 further comprising indicating means connected to said fill level sensor means for making the fill level signal at least one of optically and acoustically discernible.

12. An arrangement as defined in claim 9, further comprising valve means connected to said fill level sensor means and disposed for interrupting operating pressure to the striking mechanism when a fill level signal is present.

13. An arrangement as defined in claim 12, wherein said valve means comprises a spring charged turn-off valve which takes up a closed position when a fill level signal is present.

14. An arrangement as defined in claim 1, wherein said conveying means includes receptacle means for receiving said lubricant reservoir and said lubricant reservoir comprises a lubricant cartridge which can be exchangeably inserted into said receptacle.

* * * * *